US009414124B2

(12) United States Patent
Bihannic et al.

(10) Patent No.: US 9,414,124 B2
(45) Date of Patent: Aug. 9, 2016

(54) AUDIOVISUAL SESSION SWITCHOVER FROM A FIRST ACCESS NETWORK TO A SECOND ACCESS NETWORK (75) Inventors: Nicolas Bihannic, Trebeurden (FR); Pierre-Yves Le Lann, Lannion (FR)

(73) Assignee: Orange, Paris (FR)

( * ) Notice: Subject to any disclaimer, the term of this patent is extended or adjusted under 35 U.S.C. 154(b) by 1481 days.

(21) Appl. No.: 12/602,537

(22) PCT Filed: May 30, 2008

(86) PCT No.: PCT/FR2008/050952
§ 371 (c)(1),
(2), (4) Date: Dec. 1, 2009

(87) PCT Pub. No.: WO2008/152316
PCT Pub. Date: Dec. 18, 2008

(65) Prior Publication Data
US 2010/0177735 A1 Jul. 15, 2010

(30) Foreign Application Priority Data
Jun. 1, 2007 (FR) ...................................... 07 55420

(51) Int. Cl.
| *H04W 4/00* | (2009.01) |
|---|---|
| *H04N 21/61* | (2011.01) |
| *H04N 21/2381* | (2011.01) |
| *H04N 21/414* | (2011.01) |
| *H04L 29/08* | (2006.01) |
| *H04L 29/06* | (2006.01) |
| *H04W 36/02* | (2009.01) |
| *H04W 36/14* | (2009.01) |

(52) U.S. Cl.
CPC .......... *H04N 21/6131* (2013.01); *H04L 65/103* (2013.01); *H04L 65/1006* (2013.01); *H04L 65/1063* (2013.01); *H04L 65/1083* (2013.01); *H04L 65/4069* (2013.01); *H04L 65/605* (2013.01); *H04L 65/80* (2013.01); *H04L 67/306* (2013.01); *H04N 21/2381* (2013.01); *H04N 21/41407* (2013.01); *H04L 29/06027* (2013.01); *H04W 36/023* (2013.01); *H04W 36/14* (2013.01)

(58) Field of Classification Search
CPC ..... H04W 36/14; H04W 36/18; H04W 28/16; H04W 36/30; H04W 16/16; H04W 36/0072; H04L 47/14; H04L 47/767; H04L 47/805
USPC ................. 370/331, 401, 332, 333, 334, 352; 455/436
See application file for complete search history.

(56) References Cited

U.S. PATENT DOCUMENTS

| 2006/0014539 A1* | 1/2006 | Oh ................................ 455/436 |
| 2006/0092879 A1* | 5/2006 | Jeong et al. ................... 370/331 |
| 2006/0199588 A1* | 9/2006 | Gao et al. ....................... 455/442 |
| 2008/0212583 A1* | 9/2008 | Rey et al. ....................... 370/390 |
| 2008/0311855 A1* | 12/2008 | Manousakis et al. ....... 455/67.11 |
| 2009/0131053 A1* | 5/2009 | Sachs et al. ................... 455/436 |
| 2009/0268661 A1* | 10/2009 | Ng et al. ........................ 370/328 |

* cited by examiner

Primary Examiner — Melanie Jagannathan
Assistant Examiner — Najeebuddin Ansari
(74) Attorney, Agent, or Firm — Drinker Biddle & Reath LLP (57) ABSTRACT A method of switching over an audiovisual session involves receiving a request for session switchover to a second access network, emitted following a change of a state of attachment of the terminal; ordering switchover of the audiovisual session from a first output interface to a second output interface at a data stream gateway; recovering information related to a context of the audiovisual session switched over to the second interface; ordering evaluation at a contents profiles server of an adaptation of quality, that can be supported by the second interface; and requesting an update of the data stream to ensure the quality adaptation.

17 Claims, 5 Drawing Sheets

AUDIOVISUAL SESSION SWITCHOVER FROM A FIRST ACCESS NETWORK TO A SECOND ACCESS NETWORK

CROSS-REFERENCE TO RELATED APPLICATIONS

This application is the U.S. national phase of the International Patent Application No. PCT/FR2008/050952 filed May 30, 2008, which claims the benefit of French Application No. 07 55420 filed Jun. 1, 2007, the entire content of which is incorporated herein by reference.

FIELD OF THE INVENTION

The field of the invention is that of telecommunications networks, and more particularly that of convergence between mobile networks and fixed networks.

The invention applies in particular to a service for distributing audiovisual contents from a contents server to a user terminal through a telecommunications network.

BACKGROUND OF THE INVENTION

The generalization of the use of the IP ("Internet Protocol") protocol in telecommunications networks has allowed the implementation of new services, whether for the Internet, telephony or for audiovisual. Such services are proposed, on the basis of dedicated architectures, on the fixed network and on the mobile network.

It is known to adapt the distribution of multimedia content to the characteristics of the user terminal and of the access network within one and the same access network, be it fixed or mobile. In particular, the person skilled in the art knows how to dynamically alter the distribution of a multimedia content, when the user terminal changes type of mobile cell and passes, for example, from an HSDPA ("High Speed Downlink Packet Access") cell to an EDGE ("Enhanced Data rates for GSM Evolution") cell, the EDGE cell offering a lower throughput than the HSDPA cell, typically 50 kbps instead of 250 kbps. Accordingly, it implements a mechanism based on an analysis of RTCP ("Real-Time Transport Control Protocol") reports transmitted by the user terminal to the contents server by RTP ("Real-Time Transport Protocol") return pathway. In the case where a succession of erroneous reports is received, the server triggers the distribution of the same content with a lower quality level. It is nevertheless noted that this adaptation is done within one and the same mobile network.

Figure 1:
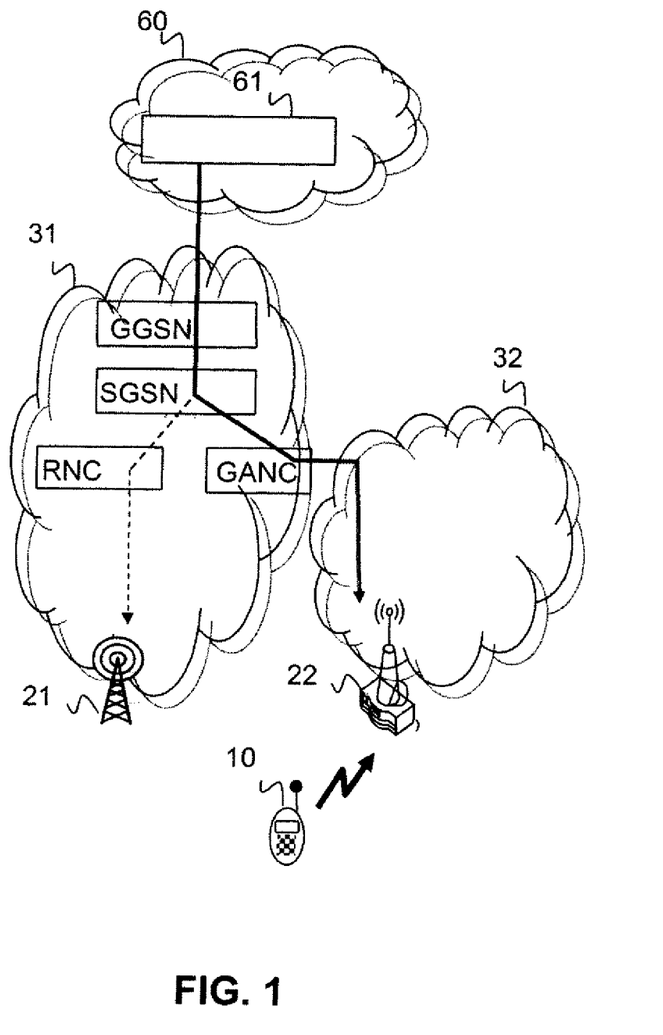
FIG. 1 presents in a schematic manner an exemplary telecommunication network implementing a method of audiovisual session switchover from a mobile access network to a fixed access network according to the prior art.

The proliferation of dedicated IP-based services and architectures poses the problem of fixed network—mobile network convergence. In this regard, the standardization body for 3GPP ("3rd Generation Partnership Project") mobile networks is currently proposing two technical solutions allowing the convergence of fixed and mobile architectures:

the first solution, based on the GAN ("Generic Access Network") protocol, supports the mobility of a user terminal between a fixed network and a mobile network of GSM ("Global Systems for Mobile Communications") type for conversational services and GPRS ("General Packet Radio Service") type for services related to packet mode data transport. A telecommunications network 1 comprising a first mobile access network 31, a second fixed access network 32 and a services platform 60 comprising a contents server 61 is presented with reference to FIG. 1. A user terminal 10, attached to the mobile access network 31 by way of an access point, of the base station type 21, is considered. This terminal is currently displaying an audiovisual content transmitted in the course of an audiovisual session that it has established with the contents server 61. The constituent data stream of the encoded audiovisual content is transmitted to it by way of the mobile access network 31 and, more precisely, via an input gateway to the mobile access network of GGSN ("Gateway GPRS Support Node") type, an SGSN ("Serving GPRS Support Node") item of equipment in charge of verifying a user's rights to the requested service and of allocating end-to-end the resources required for the implementation of this service, and an RNC ("Radio Network Controller") controller in charge of controlling the mobility of the user terminal from one base station to another and of verifying that the resources required for the implementation of the service are available on the link between the RNC, the base station and the user terminal. When the user terminal enters the zone of coverage of the fixed access network 32, it attaches itself to a radio access point linked to a domestic gateway 22 to the fixed access network 32. According to the prior art, the switchover of the audiovisual session is carried out by a controller GAN-C, situated in the mobile access network, downstream of the GGSN and which has means for carrying the data stream toward the fixed access network. It relies on an item of control equipment, called the GAN-C, which comprises means for switching over a data stream from a first interface with the mobile network to a second interface to the fixed network. A drawback of this technical solution is that the item of control equipment GAN-C is connected to the SGSN by a link which has a limited bandwidth to ensure real-time packet mode data streaming. In particular, this solution is the best for allowing the user terminal to continue to receive, by way of the fixed access network, the audiovisual content that it was currently receiving on the mobile access network, but in no case does it allow it to profit from the widened bandwidth offered by the fixed access network. Another drawback of this technique is that it monopolizes part of the resources of the mobile network to transmit a data stream to the fixed access network (from the GGSN up to the GANC);

the second technical solution, called I-WLAN (3GPP-Wireless Local Area Network Interworking), is more suited to data transport. It allows a mobile operator to offer its subscribers a service for data transport from a fixed access network. Today, it has means for ensuring the mobility of conversational services from the GSM network to a packet mode fixed network, with the aid of the Voice Call Continuity (VCC) specification. Nevertheless, today it offers no solution for the mobility of audiovisual contents distribution services.

SUMMARY OF THE INVENTION

A requirement therefore exists to propose a solution for ensuring the mobility of services related to packet mode data transport, which makes it possible to adapt the quality of the audiovisual content transported to characteristics of the access network, in particular in terms of bandwidth.

The present invention addresses this requirement by proposing a method of switching over an audiovisual session in a telecommunications network comprising at least one first access network and one second access network, an audiovisual session being in progress, during which at least one user terminal attached to said first access network and able to attach itself to said second access network receives from a contents server at least one data stream constituent of an audiovisual content by way of a data stream gateway comprising a first interface to said first access network and a second output interface to said second access network.

The method according to the invention is particular in that, when the terminal has attached itself to said second access network, said method comprises the following steps of:

receiving a request for session switchover to the second access network, said switchover request having been emitted following a change of a state of attachment of said terminal to said second network;

ordering switchover of said audiovisual session at said data stream gateway from the first output interface to the second output interface;

recovering information related to a context of said audiovisual session switched over to the second interface;

ordering evaluation at a contents profiles server of an adaptation of quality, that can be supported by said second interface, of the audiovisual content transmitted for said audiovisual session as a function of said information recovered; and receiving a response on the part of said contents profiles server and requesting updating of said data stream emitted during said audiovisual session to the contents server so as to ensure said evaluated adaptation of quality.

Thus, the invention rests upon an entirely novel and inventive approach to the management of an audiovisual session in progress, when the user terminal is in a situation of mobility from a first to a second access network. Indeed, this approach breaks down into two phases:

a first phase devoted to the switchover of the audiovisual session, in the course of which the transmitted data stream or streams is or are steered in such a way that they reach the user terminal by way of the second access network to which it has attached itself. This phase is triggered by the detection of a change of a state of attachment of the user terminal with respect to the first and second access networks. The expression change of state of attachment is understood to mean the attachment of the user terminal to the second access network or else, if it was already attached to this second network, a degradation of the conditions of attachment to the first network. The detection of such a change of state then gives rise to the sending of a session switchover request and the implementation of the method according to the invention by a gateway controller in charge of controlling the data stream gateway spliced into the path followed by the data streams between the contents server distributing these streams and the beneficiary user terminal enjoying the service. Thereafter the gateway simply implements the switchover by connecting the second interface and disconnecting the first interface;

a second phase, termed the adaptation phase, in the course of which the gateway controller recovers information related to the context of the audiovisual session within the second access network, by virtue of which information it can evaluate what adaptation of quality of the audiovisual content whose transmission is in progress could be supported by the second interface on the basis of this information, and the adaptation of quality evaluated as being able to be supported is implemented.

The invention thus makes it possible to solve the technical problem of altering the quality of an audiovisual session in a context of user terminal mobility, as a function of the resources available within the access network concerned.

According to an advantageous aspect of the invention, said method comprises, prior to the step of ordering switchover, the following steps:

sending said user terminal a command to establish connection to said second interface, said command comprising information required for said connection;

sending the data stream gateway a notification of sending of command for connection to the terminal, comprising information relating to said session and to said terminal.

According to this aspect of the invention, the switchover of the data stream or streams of the audiovisual session actually takes place only when the user terminal is indeed connected to the second interface. Likewise, the gateway informs the controller when the switchover is actually effective. An advantage is that this avoids any interruption in the transmission of the audiovisual content.

According to another aspect of the invention, the switchover method comprises, following the step of ordering switchover and prior to the step of requesting updating of said data stream, a step of receiving a notification on the part of said gateway indicating that the switchover of said data stream has been performed.

An advantage is that the adaptation of the audiovisual session is implemented only once the switchover from the first to the second interface is actually effective.

According to another aspect of the invention, said recovered context information comprises at least one information item from among the following information:

an information item relating to a profile of said user;

an information item relating to resources of the connection established between said second interface and the user terminal when the latter is attached to the second access network;

an information item relating to network resources between said contents server and said gateway;

an information item relating to capabilities of said user terminal; and an information item relating to characteristics of encoding of the audiovisual content by the contents server.

The information relating to a profile of the user advises regarding a type of subscription to which said user has signed up. This information makes it possible to verify that said user has indeed acquired the right to receive an audiovisual content with an improved quality.

The information relating to resources of the connection established between the second interface and the user terminal relates in particular to the bandwidth available on this connection. This bandwidth can be a minimum static value fixed a priori or a dynamic value measured in real time on said connection.

An information item relating to resources on a link followed by the data stream or streams between said contents server and said gateway is for example a value of bandwidth, static or dynamic, for said link.

An information item relating to capabilities of said user terminal is, for example, a memory capacity or characteristics of a processor of said terminal.

An information item relating to characteristics of encoding of the audiovisual content by the contents server advises, for example, regarding a throughput of a data stream constituent of the audiovisual content.

Such information is advantageously utilized by the contents profiles server to determine whether an adaptation of the quality of the encoded audiovisual content transmitted to the user terminal in the course of the audiovisual session can be improved.

According to another aspect of the invention, the audiovisual content is encoded in the form of a plurality of scaled data streams, comprising a basic stream and at least one enhancement stream and the response of said contents profile server indicates a number of enhancement streams to be activated.

Indeed, scaled encoding, by producing a basic stream and at least one enhancement stream, makes it possible to carry out decodings leading to a quality which increases with the number of decoded streams. More precisely, the so-called basic stream leads to a decoded audiovisual content exhibiting a basic quality. If this is supplemented with the decoding of an enhancement stream, a decoded audiovisual content of improved quality is obtained. A second enhancement stream makes it possible to further improve the quality of the decoded audiovisual content etc.

According to this aspect of the invention, the adaptation of quality which can be supported by the session is translated by the contents profile server into a number of enhancement streams whose transmission must be activated. For example, assuming that the contents server has encoded the audiovisual content in the form of a basic stream at 2 Mbits/s, a first enhancement stream at 2 Mbits/s and a second enhancement stream at 1.5 Mbits/s, then, if the second interface offers an additional throughput of 2 Mbits/s, the contents profile server can decide to activate the transmission of the first enhancement stream for the audiovisual session in progress.

A first advantage related to the use of scaled streams is that the capabilities for storing the streams at the contents server level are optimized by avoiding having to store as many data streams as throughputs or image size required by the contents distribution service.

A second advantage is that it simplifies the implementation of the adaptation of quality at the level of the data stream gateway, in particular to avoid transmission interruptions. It is indeed understood that with scaled streams, the adaptation of quality following an increase in available throughput is simply implemented by transmitting an additional data stream, without modifying the transmission of the basic stream in progress. It is therefore simpler to avoid any interruption of display at the user terminal level.

According to another aspect of the invention, when the response of said content profile server comprises an indication of activation of at least one enhancement stream, said method comprises the following steps:

ordering emission of said at least enhancement stream to the contents server;

receiving a notification by the gateway of the receipt of said at least one enhancement stream on its input interface;

sending the user terminal a command for establishing additional connection to said second interface of said gateway, said command comprising information relating to said additional connection;

sending the gateway a notification indicating that said at least one enhancement stream received is intended to be transmitted by way of said additional connection; and receiving a confirmation of establishment of the additional connection and of transmission of said at least one enhancement stream.

According to this aspect of the invention, the controller requests the terminal to establish a new connection with the second interface of the data stream gateway only after having received on the part of the gateway a confirmation of receipt of part of the enhancement stream. The controller also provides the gateway with the information necessary for establishing this connection with the user terminal. The gateway therefore knows in advance the destination of the enhancement stream that it has begun to receive and it waits for the connection with the user terminal to be established in order to trigger the actual transmission of this enhancement stream to the user terminal.

An advantage is that this guarantees that the transmission of the enhancement stream takes place under good conditions.

According to another aspect of the invention, the switchover method comprises a step of saving context information relating to the connections established between said user terminal and said data stream gateway in respect of said audiovisual session for a predetermined duration.

The benefit of this saving step is found in particular in the following example. A user terminal in a situation of mobility from a first mobile access network to a second fixed access network, for example a wireless access to a domestic gateway connected to the IP network, is considered. Assuming that the fixed access network offers conditions favorable to an improvement of the quality of the audiovisual session in progress, for example, a higher bandwidth than the mobile access network, the implementation of the method according to the invention allows not only the switchover of the audiovisual session from the first mobile network to the second fixed network without interruption of transmission, but also an adaptation of the quality of the session carried out by transmitting to the terminal at least one enhancement stream in addition to the basic stream that it received when it was attached to the first access network. The case is considered where the user leaves his house and reattaches to a mobile access network, for example, to the first access network. The method according to the invention is implemented again. The user, who now receives only the basic stream, realizes that the quality of the audiovisual content has greatly degraded since he left his home and he decides to return to the house until the audiovisual session terminates.

This aspect of the invention therefore makes it possible to very rapidly restore on the user terminal the context that had been established in the second access network and therefore to allow him to very rapidly retrieve the improved transmission quality from which he benefited at his home, for example.

The save is ensured only for a predetermined duration, corresponding to a time span beyond which it can be considered that the user in a mobility situation has moved sufficiently far from the second access network as not to return thereto. The memory is thereafter freed.

According to another aspect of the invention, when an additional connection has been established with the first interface of said gateway so as to transmit an enhancement stream, said method comprises, following the step of receiving a request to switch the session over to said second access network, a step of disconnecting said additional connection.

The underlying assumption is recalled, according to which the first and the second access network have sufficient resources to ensure real-time transmission of the basic stream of the audiovisual content. According to this aspect of the invention, before any operation of switchover from the first to the second access network, the transmission of the audiovisual content during the audiovisual session in progress is reduced to the basic stream. This makes it possible to guarantee that the first switchover phase will take place under good conditions, without interruption. If it is established during the second adaptation phase that the second access network has the resources to support the real-time transmission of the enhancement stream, an additional connection with the second interface will be established to implement the transmission of this enhancement stream.

The invention also relates to an audiovisual data stream gateway controller in a telecommunications network comprising a first access network, a second access network and a data stream gateway comprising an input interface able to receive data streams and a first and a second output interface able to transmit said streams respectively to the first and the second access network, an audiovisual session being in progress during which a user terminal attached to said first access network and able to attach itself to said second access network receives from a contents server at least one data stream constituent of an audiovisual content by way of said first interface.

According to the invention, such a controller is characterized in that it comprises means for:
- receiving a request for switchover of said audiovisual session to the second access network, emitted following a change of a state of attachment of said user terminal to said first and second access networks;
- sending said gateway a command for switchover of said audiovisual session from said first interface to said second interface;
- recovering information related to a context of said audiovisual session switched over to the second interface;
- ordering evaluation of an adaptation of quality of said audiovisual session that can be supported by said second interface as a function of said information recovered; and
- requesting updating, by said contents server, of the audiovisual session making it possible to ensure said supported adaptation of quality.

The invention also relates to a data stream gateway in a telecommunications network comprising at least one first access network and one second access network, said gateway comprising an input interface able to receive at least one data stream emitted by a contents server and first and second output interfaces able to transmit said at least one data stream received respectively to said first and second access network, an audiovisual session being in progress during which at least one user terminal attached to said first access network and able to attach itself to said second access network receives at least one data stream constituent of an encoded audiovisual content by way of said first output interface.

According to the invention, said gateway is characterized in that it comprises:
- means for receiving a command for switchover of said audiovisual session from the first to the second interface, emitted following a change of a state of attachment of said user terminal to said first and second access networks;
- means for switching over the audiovisual content from the first interface to the second interface when transmission is in progress;
- means for receiving a notification of adaptation of quality of said audiovisual session by said contents server; and
- means for updating said second output interface which are able to implement said adaptation of quality.

According to an advantageous aspect of the invention, the gateway is able to implement said switchover means after receiving said notification and it is able to implement means for sending a confirmation of switchover to said controller, once said connection has been established with the terminal.

An advantage is on the one hand that the switchover is performed only once the new connection with the second interface has been established and that the gateway controller is informed that it can instigate the adaptation phase once the data streams are actually passing through the second interface.

According to another aspect of the invention, the audiovisual content is encoded in the form of a plurality of scaled data streams, comprising at least one basic data stream and at least one enhancement stream, and the notification of updating indicates a number of enhancement data streams whose transmission must be activated. According to this same aspect of the invention, the means for updating the second interface comprise means for establishing at least one additional connection with said user terminal so as to carry said at least one enhancement stream and the gateway comprises means for sending a confirmation of updating of said session to said controller, once said additional connection has been established.

Thus, the gateway according to the invention makes it possible to establish with the user terminal as many connections with the second interface as enhancement streams necessary for the adaptation of quality of the audiovisual session in progress.

According to another advantageous aspect of the invention, the data stream gateway is positioned in such a way that the first interface is connected to a first input gateway to the first access network and the second interface is connected to a second input gateway to the second access network.

The data stream gateway according to the invention therefore comprises a direct physical interface with each of the two access networks. An advantage of positioning the data stream gateway at the boundary of the first and second access networks is that the data streams carried to the user terminal via the second access network are prevented from passing through the first access network and vice versa. The path of the data streams to the user terminal, whether through the first or the second access network, is thereby optimized. Another advantage is that of not continuing to monopolize the resources of the first access network to transmit the data streams to the user terminal, when the audiovisual session is switched over to the second access network. Indeed, the resources of the first access network can be freed as soon as the audiovisual session is switched over to the second access network.

The invention also relates to a user terminal in a telecommunications network comprising a first and a second access network and a data stream gateway comprising an input interface able to receive data streams and a first and a second output interface able to transmit said streams respectively to the first and the second access network, an audiovisual session being in progress, during which said terminal, attached to said first access network and able to attach itself to said second access network, receives at least one data stream constituent of an audiovisual content by way of a first connection to said first output interface, characterized in that said terminal is able to implement, when it has attached itself to said second access network:
- means for receiving a command for establishing a second connection to said second interface, intended to allow switchover of said at least one data stream from the first to the second interface, said command comprising information required for said connection;
- means for establishing said second connection to the second interface with the aid of said information;
- means for receiving instructions relating to an adaptation of the quality of the audiovisual session in progress on the second interface; and
- means for adapting the quality of the audiovisual session in progress.

According to an advantageous aspect of the invention, the audiovisual content is encoded in the form of a plurality of scaled data streams, comprising at least one basic stream and one enhancement stream, said instructions relating to an adaptation of the quality of the audiovisual session in progress comprise at least one command for additional connection to said second interface of said gateway, said at least one additional connection being intended to transmit at least one enhancement stream, and said means for adapting the quality of the audiovisual session are able to trigger means for establishing said at least one additional connection to said second interface of said gateway.

The invention relates furthermore to a telecommunications network comprising at least one first access network, one second access network, a data stream gateway comprising an input interface able to receive data streams and a first and a second output interface able to transmit the streams received respectively to the first and the second access networks and a gateway controller able to control said gateway, an audiovisual session being in progress, during which said terminal, attached to said first access network and able to attach itself to the second access network, receives at least one data stream constituent of an audiovisual content by way of a first connection to said first output interface of said gateway, said network is characterized in that said gateway controller comprises means for:
  receiving a request for switchover of said audiovisual session to the second access network, emitted following a change of a state of attachment of said user terminal to said first and second access networks;
  sending said gateway a command for switchover of said audiovisual session from said first interface to said second interface;
  recovering information related to a context of said audiovisual session switched over to the second interface;
  ordering evaluation of an adaptation of quality of said audiovisual session that can be supported by said second interface as a function of said information recovered; and
  requesting updating, by said contents server, of the audiovisual session making it possible to ensure said supported adaptation of quality.

The invention relates furthermore to a contents profile server in a telecommunications network comprising at least one first access network, one second access network, a data stream gateway comprising a first and a second output interface able to pass data streams respectively to the first and second access networks and a gateway controller able to control said gateway, an audiovisual session being in progress during which at least one user terminal attached to said first access network and able to attach itself to the second access network receives from a contents server at least one data stream constituent of an encoded audiovisual content by way of said first output interface, said contents profile server being characterized in that,
said gateway controller comprising means for:
  receiving a request for session switchover to the second access network, said switchover request having been emitted following a change of a state of attachment of said terminal to said second network;
  sending said gateway a command for switchover of said audiovisual session from said first interface to said second interface;
  recovering information related to a context of said audiovisual session switched over to the second interface;
  ordering evaluation of an adaptation of quality of said audiovisual session that can be supported by said second interface as a function of said information recovered at said contents profile server; and
  requesting updating, by said content server, of the audiovisual session making it possible to ensure said supported adaptation of quality,
said contents profile server comprises means for evaluating an adaptation of quality, that can be supported by said audiovisual session, of the audiovisual content transmitted as a function of said information recovered in response to said evaluation command and means for sending a response to said controller.

The invention also relates to a mobility server in a telecommunications network, comprising at least one first access network, one second access network, a data stream gateway comprising a first and a second output interface able to pass data streams respectively to the first and second access networks and a gateway controller able to control said gateway, an audiovisual session being in progress during which at least one user terminal attached to said first access network and able to attach itself to said second access network receives from a contents server at least one data stream constituent of an encoded audiovisual content by way of said first output interface, characterized in that said mobility server is able to implement the following means for:
  receiving a notification of change of a state of attachment of said user terminal to said first and second access networks, said notification comprising at least one location of said user terminal and an identification of the audiovisual session;
  analyzing said notification of change, intended to determine whether the audiovisual session in progress must be switched over from the first access network to the second access network;
  identifying said gateway controller in charge of controlling said session on the basis of the location information;
  sending a request for session switchover from the first access network to the second access network to said gateway controller.

The invention relates finally to a computer program product downloadable from a communication network and/or stored on a support readable by computer and/or executable by a microprocessor, characterized in that it comprises program code instructions for the execution of the method according to the invention.

BRIEF DESCRIPTION OF THE DRAWINGS

Other advantages and characteristics of the invention will be more clearly apparent on reading the following description of a particular embodiment of the invention, given by way of simple illustrative and nonlimiting example, and of the appended drawings, among which.

DETAILED DESCRIPTION

The general principle of the invention relies on the implementation of a switchover of an audiovisual session in two phases:
- a phase of actual switchover of the data stream transmitted from a first interface to the first access network onto a second interface to the second access network;
- a phase of adapting the quality of the audiovisual session as a function of information related to the new context of the session in the second access network.

Figure 2:
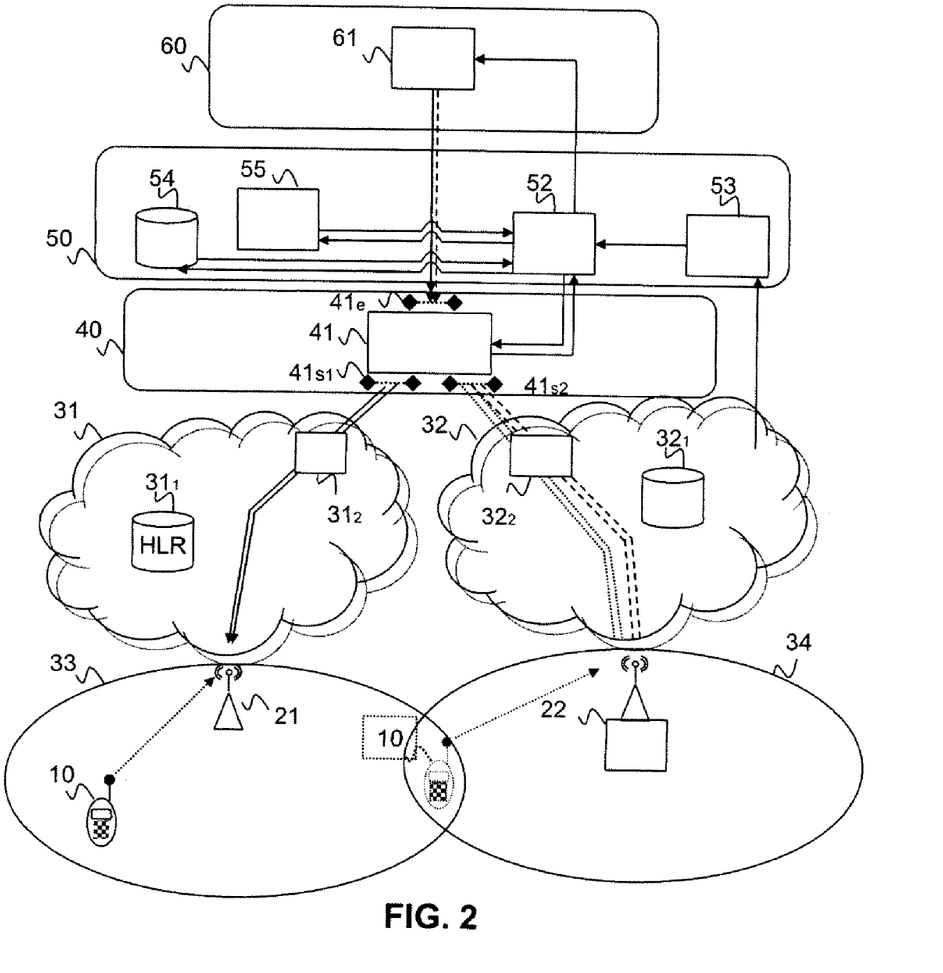
FIG. 2 presents in a schematic manner an exemplary telecommunication network implementing a method of audiovisual session switchover according to the invention.

Presented with reference to FIG. 2 is a telecommunications network 1 comprising a first access network 31, for example a mobile access network, equipped with radio access points of base station type 21 and a second access network 32, for example a fixed access network, equipped with radio access points of Wifi type linked to a domestic gateway 22. Consideration is given to a user terminal 10 comprising first means for attaching to the first access network 31 when it enters the zone of coverage 33 of this first network and second means for attaching to the second access network 32 when it enters the zone of coverage 34 of this second network.

For the requirements of the invention, it is assumed that the zones of coverage 33, 34 overlap.

The telecommunication network 1 is controlled by a telecommunications operator that also provides an audiovisual contents distribution service. Such a service is, for example, an audiovisual contents streaming service. It is recalled that "streaming" or "point-to-point" is a mechanism making it possible to transport a data stream from a source to a destination in a continuous manner, the stream being processed on the fly by the latter without there being any requirement to store it in its entirety.

This audiovisual contents distribution service is implemented by a service platform 60 comprising a contents server 61, which stores the audiovisual contents encoded in the form of one or more data streams and distributes them to the terminals of users 10 subscribing to the service.

The telecommunications network 1 also comprises an applications package control system 50, comprising a mobility server 51, a data stream gateway controller 52 and a contents profiles server 55. Such a system ensures the control of the multimedia sessions involving the terminals of users, such as a voice over IP session or an audiovisual content streaming session. It can be organized according to an architecture of IMS (IP Multimedia Subsystem) type, which is integrated into the core network infrastructure for controlling the user's multimedia sessions such as real-time services (e.g. voice and video over IP protocol). The support of the IMS is also currently being specified for the support of audiovisual services within bodies such as TISPAN ("Telecoms & Internet Converged Services & Protocols for Advanced Networks") at the IETF ("Internet Engineering Task Force") or else at the ITU ("International Telecommunication Union") in the IPTV ("Internet Protocol Television") Focus Group. It will nevertheless be noted that the invention is not limited to this type of architecture of applications package control system.

It is considered that the user terminal 10 is attached to the first access network 31 and that it has asked to display an audiovisual content available within the framework of the contents distribution service provided by the service platform 60. An audiovisual session is in progress on the terminal 10, during which it receives an audiovisual content in the form of at least one data stream. This data stream is carried as far as the user terminal 10 by way of a data stream gateway 41. This gateway is situated in a transfer plane 40 of the telecommunication network 1 between the contents server 61 and the user terminal 10. Stated otherwise, it is spliced into the data streams exchanged between the contents server 61 and the user terminal 10. It comprises an input interface $41_e$ through which the data streams emitted by the contents server 61 destined for the terminals of users subscribed to the service pass, as well as a first and a second output interface $41_{s1}$, $41_{s2}$ making it possible to carry the data streams to the first and second access networks respectively.

Here the expression interface of the gateway is understood to mean an element making it possible to link it to the user terminal 10. Such an interface consists physically of:
- a hardware card allowing interconnection with other network resources or equipment;
- a set of associated programs managing the exchanges and the transfer of information between the gateway and the other network resources or equipment.

In a preferential manner, the gateway 41 is common to the first and second access networks, that is to say its first and its second interfaces are connected directly to input gateways to the first and second access networks. For a mobile access network, such an input gateway $31_2$ is, for example, the GGSN according to the 3GPP terminology. This can also be a PDG ("Packet Data Gateway") gateway according to the TISPAN terminology. For a fixed access network, a multimedia node (NM) can, for example, play the role of input gateway $32_2$.

When the user terminal 10, in a mobility situation, enters the zone of coverage of the second access network 32, it detects a signal emitted by the radio access point of the domestic gateway 22, which constitutes a termination point of the fixed access network. The terminal performs its attachment to the fixed access network 32 by way of this access point. The terminal thereafter registers with the applications package control system 50. Once this registration has been performed, the applications package control system 50 notifies the mobility server 51 of this change of a state of attachment of the user terminal 10. After analysis of the new state of attachment of the terminal 10, which is, for example, attached simultaneously to the first and second access networks 31, 32, the mobility server 51 decides to trigger the switchover of the audiovisual session in progress, for example, to allow the user terminal to benefit from a widened bandwidth. For this purpose, the mobility server sends the gateway controller 52 a request to switch over the audiovisual session in progress from the first access network to the second. The controller 52 then triggers the implementation of the method of audiovisual session switchover according to the invention.

During a first phase, the controller 52 organizes the switchover proper of the audiovisual session. Such switchover is obtained, without interrupting transmission of the data stream, by establishing a new connection between the user terminal and the second output interface $41_{S2}$ of the data stream gateway and by switching over the data stream from the first interface to the second interface only once the new connection has been established.

During a second phase, the controller requests a contents profile server to evaluate the possibility of adapting the quality of the audiovisual session in progress. If the response is positive, the gateway controller 52 requests the contents server 61 to send the data streams making it possible to implement the adaptation. It optionally requests the gateway and the terminal to adapt the connection established with the second interface so as to be able to transmit the new data streams.

According to an advantageous embodiment, the audiovisual content is encoded in the form of a plurality of scaled audiovisual streams, comprising a basic stream and at least one enhancement stream. The basic stream offers a minimum quality of display of the decoded content. This quality can be enriched by decoding the enhancement stream or streams. The techniques which can be implemented to carry out this type of encoding are known to the person skilled in the art. They use transforms of DCT (Discrete Cosine Transform) type or wavelet transforms and an encoding of the coefficients obtained based on traversing the images according to a hierarchical tree (Set Partitioning in Hierarchical Trees or SPIHT) or according to the high order or low order bit planes.

According to this embodiment, the contents server 61 can adapt the quality of the audiovisual session by transmitting at least one enhancement stream in addition to the basic stream. It informs the gateway 41 of the updating of the transmitted streams. As soon as it has begun to receive the additional enhancement stream or streams, the controller 52 is informed thereof by the gateway 41, and said controller requests the user terminal 10 to establish with the gateway 41 a new connection intended to carry the additional enhancement stream or streams from the second interface of the gateway to the user terminal. The terminal 10 establishes this new connection with the gateway 41. The latter can then enable the new connection and begin to transmit the enhancement stream. Finally, it notifies the controller of the implementation of the new connection.

Figure 3:
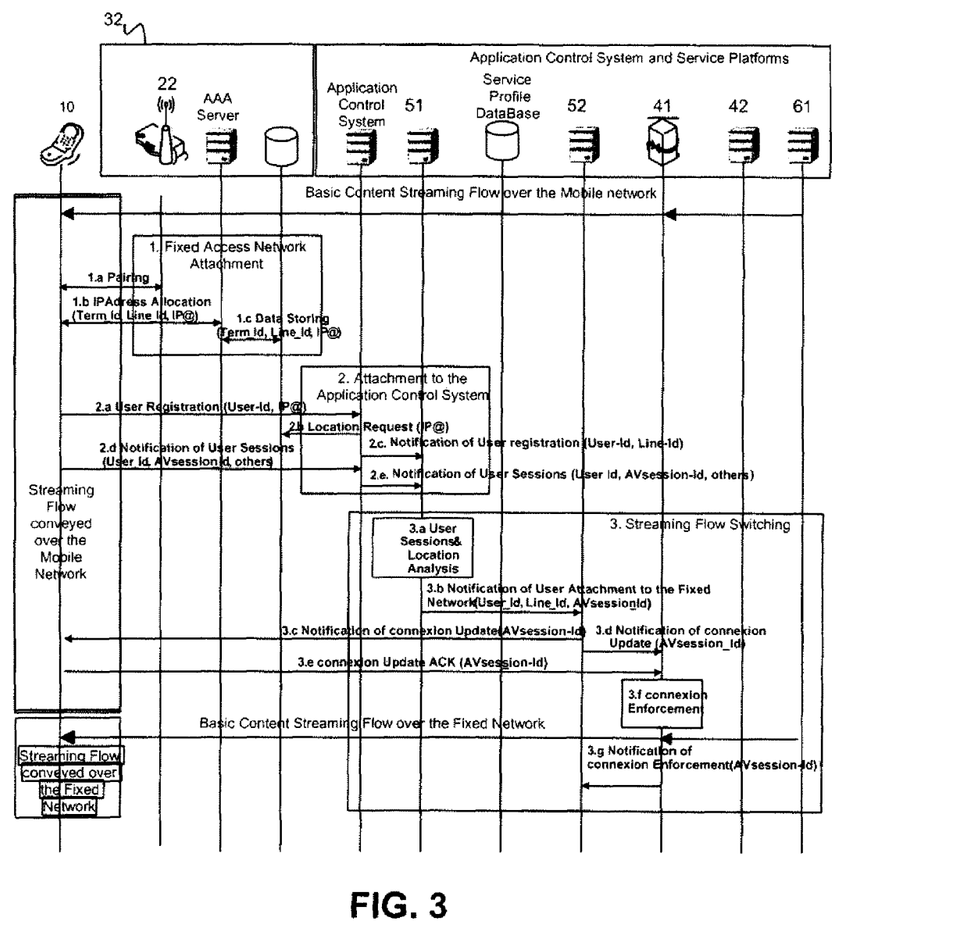
FIG. 3 presents a sequential diagram of a first phase of switchover implemented by the method of audiovisual session switchover according to the invention, when the first access network is a mobile access network and a second access network is a fixed access network.

Presented in a sequential manner with reference to FIG. 3 are a phase of attachment of the user terminal to the second fixed access network, a phase of attachment to the applications package control system and the phase of switchover of the data stream according to the invention. The exemplary instantiation presented pertains to the applications package control system 50 such as specified at TISPAN.

1—Phase of Attachment of the Terminal to the Fixed Access Network.

At 1.a, the terminal detects the signal of the radio access point of the gateway 41 which constitutes the termination point of the fixed access network. There is pairing of the terminal with the radio access point of the gateway 41, for example on the basis of the SSID ("Service Set Identifier") emitted by the access point 22 which allows the user terminal 10 to recognize the fixed access network. At this juncture, the securing of the exchanges on the radio pathway can also be activated via level-2 mechanisms such as WEP ("Write Equivalent Privacy"), WPA2 (Wi-Fi Protected Access 2"). The securing can also be decided during the subsequent phases (securing of IP or applications package level, for example with the aid of TLS ("Transport Layer Security")).

At 1.b, the terminal performs its attachment to the fixed access network. An identification, authentication and control of user access to the network can be implemented in an optional manner with an AAA server ("Authentication, Authorization, Accounting (AAA) Server"). During this attachment, the terminal informs the fixed access network of its technical characteristics. Attachment terminates with the allotting of an IP address (@ IP) to the terminal. The obtaining of the IP address can be obtained by DHCP ("Dynamic Host Configuration Protocol") exchanges between the terminal and the DHCP server corresponding to the implementation of the authentication server in this case. For example, the terminal conveys its identifier "Term_Id" through option 60 of the DHCP protocol. The access link identification will, for example, be integrated into option 82 of the DHCP protocol by an item of network equipment such as the DSLAM ("Digital Subscriber Line Access Multiplexer").

The characteristics of the terminal are typically the series/model/supplier identifiers, the browser version, the screen size and resolution (CIF ("Common Intermediate Format"), QVGA ("Quarter Video Graphic Array")). The parameters exchanged in this step are:
  the characterization of the terminal,
    the identification of the access link to the gateway 41 on the basis of which the terminal has attached itself to the fixed access network, and
    the IP address allocated to the terminal.

At 1.c, the previous information relating to the attachment of the user are recorded in an access database $32_1$. The access database is typically the implementation of the CLF ("Connectivity Session Location and Repository Function") defined by TISPAN. No protocol has been standardized to date by TISPAN for writing to the base by the DHCP server. It will be noted that, according to the 3GPP terminology, this access database corresponds to the HLR ("Home Location Register") database $31_1$ in the mobile access network 31.

This is supplemented with:
  the static characteristics of the fixed access link such as are defined during the order/delivery process, namely the throughput supported by the access link, and
  the characteristics of the sessions in progress for the access link considered. This information is said to be dynamic and is supplied by equipment of the access network.

This information is correlated, this signifying, for example, that the access link identification can be known on the basis of the information item regarding the IP address used.

2—Phase of Attachment of the User to the Applications Package Control System:

It is considered, by way of example, that embedded in the terminal is an SIP client for supporting the exchanges with the IMS.

At 2.a, the user registers with the applications package control system by informing the applications package control system of his identity which will be used to access the services to which he has signed up. For example, the user registers at the IMS with the SIP REGISTER scheme, indicating his identity, denoted "User_Id", as parameter. Exchanges take place between the terminal and the S-CSCF SIP server to identify, authenticate and authorize the user.

The parameters exchanged in this step are:
  the data identifying the user,
  the IP address allocated to the terminal.

At 2.b, the applications package control system interrogates the access database $32_1$ of the second access network 32 to ascertain the user's location. The parameter used for the interrogation of the base is the IP address allocated to the terminal. An item of equipment P-CSCF playing the role of first SIP proxy of the IMS (Proxy-Call Server Control Function) interrogates the CLF database via the TISPAN e2 interface supporting the Diameter protocol so as to recover the access link information item (Line_Id) associated with the IP address allocated to the terminal.

At 2.c, the applications package control system notifies the mobility server 51 of the registration of the user and of his location in the second access network. The information uploaded is the identity of the user and his network location (identification of the line typically). The S-CSCF SIP server notifies the mobility server 51 of the registration of the user via the SIP REGISTER scheme. The location information item is inserted into the SIP REGISTER.

At 2.d, the user's terminal notifies the applications package control system of the user's multimedia sessions in progress, for example the SIP server (S-CSCF), with the aid of an SIP MESSAGE. The user's identifier and the session identifiers are inserted. The parameters exchanged in this step are:
- the user's identifier,
- the services in progress on the user terminal 10 by way of the first (mobile) access network and in particular the audiovisual session in the present case.

At 2.e, the applications package control system, for example the server SP S-CSCF, notifies the mobility server 51 of the user's multimedia sessions in progress, for example by relaying the SIP MESSAGE to the mobility server. The parameters exchanged in this step are:
- the user's identifier,
- the services in progress on the user terminal 10 by way of the first (mobile) access network and in particular the audiovisual session in the present case.

In the present case, we consider that the user is currently viewing a multimedia content and there is then triggering of the phase of switching over the distribution stream onto the fixed access network.

3—Phase of Switchover of the Streaming Stream.

It is recalled that the instigation of this phase of switchover of the audiovisual session in progress is triggered at the gateway controller 52 level by the receipt of a switchover request in the following manner:

At 3.a, on the basis of the information item regarding the user's location (uploaded in step 2.c) and of the knowledge of the topology of the network, the mobility server 51 identifies the controller of the data stream gateway 52 that is in charge of controlling the gateway 41 through which the multimedia content is delivered to the user terminal 10.

At 3.b, the mobility server 51 sends the controller of the gateway 52 a request for switchover of the audiovisual session onto the fixed access network 32. The information received by the controller, for example in an SIP message, is:
- the identifier of the access link,
- the IP address of the user,
- the identifier of audiovisual session in progress.

It will be noted that the user's identity used during his registration with the applications package control system is not necessarily that used during this third phase of content switchover. This is due to the fact that the access network and the applications package control system may be managed by two different operators and therefore use different identities for one and the same user. Another reason stems from the fact that the second access network does not necessarily identify the user during the allocation of the IP address and that the applications package control system therefore cannot supply the access database $41_1$.

Consequently, the use of the IP address is preferred to the use of the identities to identify the user terminal during the exchanges implemented during this third phase.

At 3.c, the gateway controller 52 sends the user terminal 10 a command to establish connection to said second interface $41_{S2}$, said command comprising information required for said connection. The controller informs the user terminal of an imminent switchover from the mobile network to the fixed network for the audiovisual session in progress. The scheme used may rely on sending an SDP ("Session Description Protocol") file or on sending an SNMP ("Simple Network Management Protocol") message. This file or this message must contain the parameters required by the terminal in order to establish the connection (server url, content url, identification key, @IP and source port; @IP and destination port) making it possible to proceed with the transfer of the basic layer via the interfaces associated with the new network connection (media leg).

This information comprises in particular parameters for carrying out the switchover such as an identifier of the new interface of the gateway through which the distribution stream must now pass. Another parameter exchanged in this step is the identifier of audiovisual session in progress.

At 3.d, the gateway controller 52 notifies the gateway 41 of the sending of a command to establish connection to the terminal intended to update the second interface for the transfer of the content currently being distributed by way of the first interface. Such a notification comprises information relating to the audiovisual session and to the user terminal. Another parameter exchanged in this step is the identifier of audiovisual session in progress. The notification can be carried out with the H248 protocol, as specified by TISPAN. Other protocols can also allow command of the updating of the transfer plane such as RTCP.

In the H248 case, the MODIFY command makes it possible to update the output interface to the terminal so as to execute the switchover.

At 3.e, the user terminal 10 establishes the new connection with the gateway 41 in conformity with the parameters of the notification 3.c. It does it by emitting an RTSP request constructed utilizing the parameters provided by the gateway controller (server url, content url, identification key, @IP and source port; @IP and destination port). Another parameter exchanged in this step is the identifier of audiovisual session in progress.

At 3.f, the gateway executes the update of the switchover of the first interface $41_{S1}$ to the mobile network to the second interface $41_{S2}$ to the fixed network. Henceforth, the switchover is effective, thereby allowing in particular the operator to release the use of resources of the mobile network in favor of less expensive, fixed-network resources. At this juncture, the switchover of the audiovisual content currently being distributed is effective, without adaptation of the quality. The optional adaptation of quality of the audiovisual session will be implemented in phase 4.

At 3.g, the gateway 41 informs the gateway controller 52 of the carrying out of the switchover. This notification of the updating of the interface is done with the NOTIFY message in the case of an implementation using the H248 protocol. The parameter exchanged in this step is the identifier of audiovisual session in progress.

Figure 4:
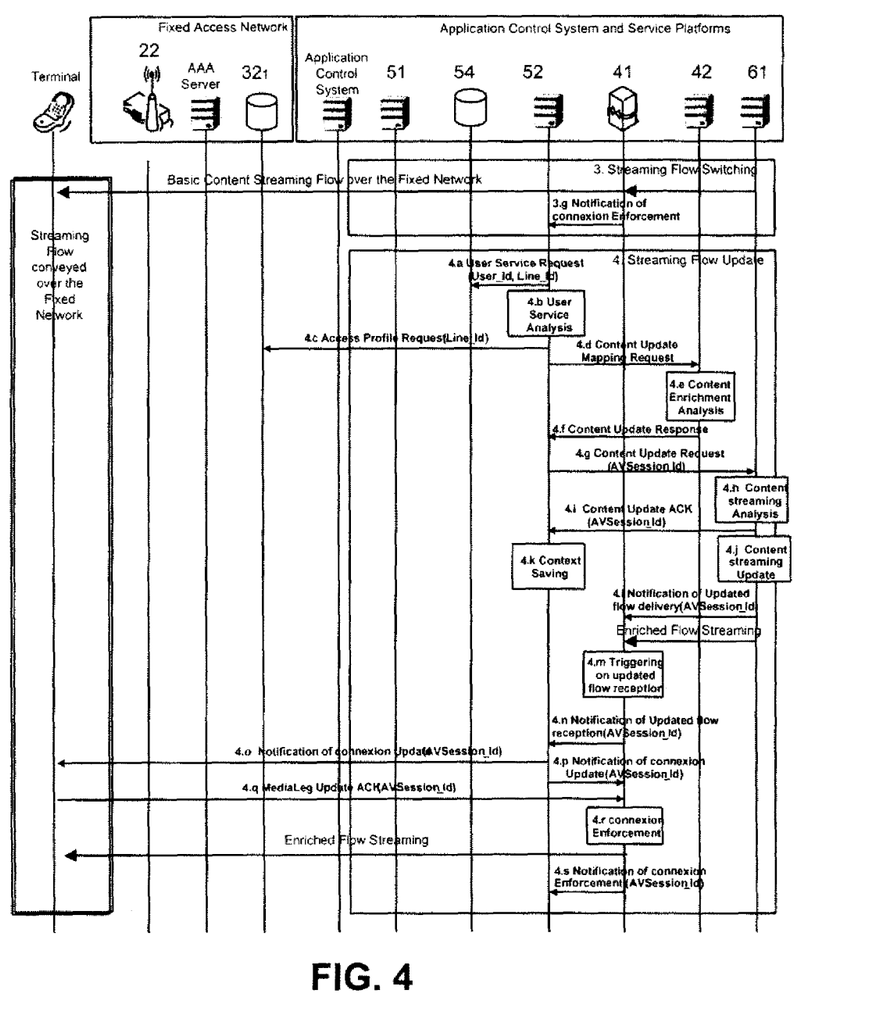
FIG. 4 presents a sequential diagram of a second phase of adapting an audiovisual session implemented by the method of audiovisual session switchover according to the invention, when the first access network is a mobile access network and the second access network is a fixed access network.

Presented thereafter with reference to FIG. 4 is a sequence diagram of the phase of adapting the quality of the audiovisual session after its switchover from the first to the second interface of the gateway.

4—Phase of Adapting the Quality of the Audiovisual Session:

At 4.a, the gateway controller 52 interrogates a database 54 of the user's services profiles, so as to ascertain this user's rights in respect of the service for enhancing the quality of display for the access link considered. The parameters exchanged in this step are:
- the user's identifier,
- the identifier of the access link.

It is considered here that the implementation of this phase can correspond to a service offer to the user on the part of the operator. It is for this reason that the operator performs a check of the user's rights in respect of this service.

In the case of an instantiation by an architecture of IMS type, the service profile base ("Service Profile Database") corresponds to the HSS ("Home Subscriber Server") in the 3GPP terminology or UPSF ("User Profile Server Function") according to the TISPAN terminology. Exchanges using a protocol to interrogate a database, of Diameter type, make it possible to recover the user's service profile.

At 4.b, the gateway controller 52 analyzes the user's rights in respect of the service. It will be noted that the user may have acquired different access rights in respect of the various access networks and therefore that he may have a right to the enhancement service for certain access networks and not for others.

At 4.c, the gateway controller interrogates the access database $32_1$ on the basis of the identifier of the access link, so as to recover information related to a context of said audiovisual session switched over to the second interface. This involves in particular obtaining information regarding the availability of the resources of the line used by the user as well as the characteristics of the user terminal 10. The controller obtains in response:

- a static or dynamic datum related to the line used by the user. The static datum (DS) corresponds to the access link characteristic such as defined during the order/delivery process. The dynamic datum denoted DD corresponds to the resource remaining after subtraction of the network resources used by the services in progress on this access link;
- the capabilities of the user's mobile terminal.

In the TISPAN specification, the interface between the gateway controller 52 and the access database $32_1$ is named interface e2 and the protocol used to recover the access parameters is Diameter.

At 4.d, the gateway controller orders the contents profiles server 55 to evaluate an adaptation of quality, that can be supported by the second interface, of the audiovisual content transmitted for the audiovisual session in progress as a function of the information recovered. In particular, the controller 52 interrogates the contents profile server 55 regarding those characteristics of the content (versions, formats, qualities, possible enrichment levels) currently being distributed which can be supported by the second interface as a function of its available bandwidth and by the user terminal as a function of its capabilities.

When the input data are DS data, the content characteristics returned are the guaranteed minimum value. Remark: the guaranteed minimum value constitutes an enhancement of the quality of the content having regard to:

- the high bandwidth capability of fixed networks as compared with the more limited bandwidth for mobile networks,
- the assumption that the access link is configured/partitioned to provide at the minimum the bandwidth required for the "guaranteed minimum performance" mode.

When the input data are DD data, the content characteristics returned are optimized and benefit to the maximum from the remaining and available bandwidth for the access link considered.

This step can, for example, be implemented with the aid of a protocol of Web services or HTTP ("Hypertext Transfer Protocol") type with data such as the type of access, the type of terminal, the network resources and service profile as input parameters.

At 4.e, on the basis of the data relating to the terminal and to the bandwidth (DS: static bandwidth not taking into account the sessions in progress on the line considered—DD: dynamic bandwidth corresponding to the remaining bandwidth), the content profiles server analyzes the adaptation of quality which may be supported on the second access network for the transmission of the audiovisual content.

At 4.f, the contents profile server 55 sends back to the gateway controller 52 the adaptation-of-quality characteristics that can be supported, for example by using a protocol of Web services or SNMP or http type.

At 4.g, the gateway controller 52 requests the contents server 61 for an update of the quality of the content currently being distributed on the terminal on the basis of the adaptation characteristics returned during phase 4.f. A parameter exchanged in this step is the identifier of audiovisual session in progress.

The gateway controller 52 emits one or more requests (RTSP or SIP) to the contents server, which requests are constructed utilizing the parameters provided by the contents profile server (server url, content url, identification key, @IP and source port; @IP and destination port). In the case of an SIP implementation, this step requests an upgrade of the content server so as to support this protocol. In the case of an RTSP implementation, it is up to the MGW controller to support the RTSP proxy function.

At 4.h, the contents server 61 analyzes the update request. It verifies in particular its capability to process the adaptation-of-quality request.

At 4.i, the contents server 61 authorizes the update request. A parameter exchanged in this step is the identifier of audiovisual session in progress. The scheme used is, for example, based on the emission of RTCP messages.

At 4.k, the gateway controller 52 saves context information comprising in particular the characteristics of the adaptation of quality of phase 4.f. The benefit of this saving of the context will be explained subsequently in the document.

At 4.l, the contents server 61 notifies the gateway 41 of the updating of the audiovisual session and therefore of the imminent transfer of the enhancement streams allowing the adaptation of quality. A parameter exchanged in this step is the identifier of audiovisual session in progress. The scheme used is based on RTCP message emission.

In the particular embodiment according to which the audiovisual content is encoded in the form of a basic stream and of at least one enhancement stream, the adaptation of quality results in the sending, by the contents server 61 to the gateway 41, of an enhancement stream, as a supplement to the basic stream.

The following steps relate to the implementation of the reception of this enhancement stream by the user terminal 10:

At 4.m, the gateway 41 places itself on standby awaiting receipt of the enhancement stream.

At 4.n, the gateway 41 notifies the gateway controller 52 of the receipt of the enhancement stream. A parameter exchanged in this step is the identifier of audiovisual session in progress. Such a notification is done with the aid of a NOTIFY message in the case of an implementation using the H248 protocol.

At 4.o, the gateway controller 52 informs the user terminal of an imminent enrichment of the quality of the content for the audiovisual session in progress and sends it a command for additional connection to the second interface $41_{S2}$ of the gateway 41. This command comprises, in particular, information relating to said additional connection. A parameter exchanged in this step is the identifier of audiovisual session in progress. The scheme used can rely on the sending of an SDP file or on the sending of an SNMP message. This file or this message must contain the parameters required by the terminal in order to establish the connection (server url, content url, identification key, @IP and source port; @IP and destination port) making it possible to proceed with the transfer of the enhancement streams.

At 4.p, the gateway controller 52 sends the gateway 41 a notification indicating that the enhancement stream received is intended to be transmitted via the additional connection. A parameter exchanged in this step is the identifier of audiovisual session in progress. In an H248 context, the creation of new interface(s) for supporting the enhancement stream is done using the ADD command.

At 4.q, the terminal establishes the additional connection with the gateway in conformity with the parameters of the notification 4.o. A parameter exchanged in this step is the identifier of audiovisual session in progress. It does so, for example, by emitting RTSP requests constructed utilizing the parameters provided by the MGW controller (server url, content url, identification key, @IP and source port; @IP and destination port). The requests, once processed by the gateway 41 (sequence 4r), trigger the transfer of the selected enhancement layers.

At 4.r, the gateway 41 enables the additional connection so as to send the enhancement stream to the user terminal 10.

Henceforth, the user views an enhanced content which exploits the capabilities of the terminal and the capabilities of the access link to the second access network.

At 4.s, the gateway notifies the gateway controller of the enabling of the additional connection for the transmission of the enhancement stream to the user terminal 10. This notification is done with the NOTIFY message in the case of an implementation using the H248 protocol.

The case where the user decides to leave his home before the end of the audiovisual session is now considered by way of second example. Recall that he initiated the audiovisual session from the mobile access network. When he returned home, the audiovisual session was switched over to the fixed network so as to permit the user to benefit from the more favorable transmission conditions and so as to free the resources of the mobile network.

The user now wishes to continue to view the session in progress during his travels. It is assumed, as previously, that the user is in the zone of coverage of the mobile access network and that his terminal is attached to this mobile access network. It may also be considered that the user terminal was not deactivated from the mobile network during connection thereof to the fixed network.

Figure 5:
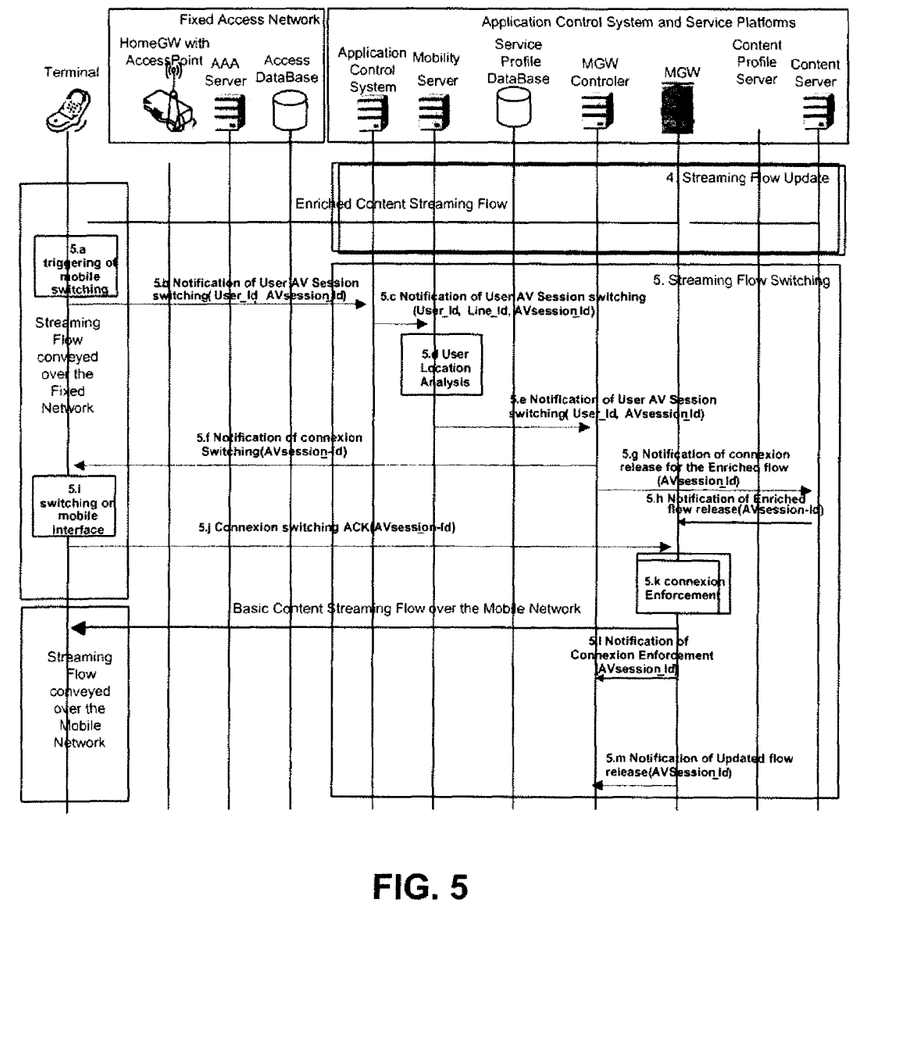
FIG. 5 presents a sequential diagram of a first phase of switchover implemented by the method of audiovisual session switchover according to the invention, when the first access network is a fixed access network and a second access network is a mobile access network.

A sequencing of steps implemented during the switchover of the audiovisual session, from the first fixed access network to the second mobile access network, is now presented with reference to FIG. 5.

At 5.a, the user terminal detects poor quality of the radio signal originating from the radio access point of the domestic gateway 22, because he is getting progressively further away from this access point.

At 5.b, the user terminal 10 informs the applications package system 50, for example an S-CSCF (Serving Call Session Control Function) SIP session controller, that it wishes to deregister from the fixed access network. The parameters exchanged in this step are in particular:

the user's identifier,
the identifier of audiovisual session in progress.

It does so, for example, with the aid of an SIP message.

It will also be noted that, concerning fixed access, the applications package control system 50 verifies at regular (and parametrizable) time intervals that the user is still connected to the fixed access network since the terminal regularly sends registration messages of the type "keep alive".

At 5.c, the applications package control system 50, by way of the S-CSCF SIP server, transmits to the mobility server 51 a notification of deregistration of the terminal from the fixed access network, comprising a user terminal location information item, for example, an identifier of the access link to which the gateway 22 is connected. It uses, for example, an SIP message.

It is assumed here that the applications package control system 50 keeps in memory the information item regarding the location of the user attached to the fixed access network. In the converse case, the applications package control system interrogates the access database $32_1$ as in step 2.b. The parameters exchanged in this step are in particular:

the user's identifier,
the identifier of audiovisual session in progress,
the identifier of the access link.

At 5.d, the mobility server 51 analyzes the notification received and decides to trigger the switchover of the audiovisual session from the first to the second access network. Accordingly, on the basis of the user location information item and of the knowledge of the topology of the network, the mobility server 51 identifies the controller of the data stream gateway 52 in charge of controlling the gateway 41 through which the multimedia content of the audiovisual session relevant to the switchover request is transported.

At 5.e, the mobility server 51 sends the gateway controller 52 a request for switchover of the audiovisual session in progress to the mobile network. The parameters exchanged in this step are in particular:

the user's identifier,
the identifier of audiovisual session in progress.

At 5.f, the gateway controller 52 informs the user terminal 10 of an imminent switchover from the fixed network to the mobile network for the audiovisual session in progress and sends it a command for establishing connection to the first interface of the gateway 41 to the mobile access network 31. This command comprises information required for the implementation of such a connection, indicating in particular the address of the first output interface $41_{s1}$ of the gateway 41 through which the data stream constituent of the audiovisual content must now pass.

The scheme used can rely on the sending of an SDP file or on the sending of an SNMP message. This file or this message must contain the parameters required by the terminal in order to establish the connection (server url, content url, identification key, @IP and source port; @IP and destination port) making it possible to proceed with the transfer of the basic layer on the mobile network with the associated interface. These parameters can by default be extracted from a database storing the initial network context (before the first switchover).

At 5.g, the gateway controller 52 requests an update of the quality of the content. Indeed, when an additional connection has been established with the second interface of the gateway 41 so as to transmit an enhancement stream to the fixed access network, the method according to the invention comprises a step of disconnecting this additional connection. The gateway controller 52 emits one or more requests (RTSP or SIP) on the content Server to interrupt the transfer by the content server of the enhancement levels identified for this session during the enrichment phase. The requests are constructed utilizing the parameters obtained by the MGW during the enrichment phase (server url, content url, identification key, @IP and source port; @IP and destination port) corresponding to the sequence 4.n.

At 5.h, the content server ceases to send the content enriched for the session in progress. The transmission of the enhancement stream is thus halted. Only the transmission of the basic stream is maintained during the switchover process.

The contents server 61 informs the gateway of the stoppage of transfer of the selected enhancement levels. The scheme used is based on RTCP message emission.

At 5.i, on receipt of the information item of step 5.f, the terminal establishes a connection with the first output interface $41_{S1}$ of the gateway 41. It does so, for example, by emitting an RTSP request constructed utilizing the parameters provided by the MGW controller (server url, content url, identification key, @IP and source port; @IP and destination port).

At 5.j, the terminal switches over to the first interface with the mobile network.

At 5.k, the gateway executes the update of the switchover from the interface of the fixed network to the interface of the mobile network. At the end of this step, the user views the basic content through the interface of the mobile network.

At 5.l, the gateway 41 informs the gateway controller 52 of the carrying out of the switchover. A parameter exchanged in this step is the identifier of audiovisual session in progress. The notification of the updating of the interface (with the mobile network) is done with the NOTIFY message in the case of an implementation using the H248 protocol.

At 5.m, the gateway 41 notifies the gateway controller 52 of the deactivation of the enhancement stream. This notification of the freeing of the resources for the enhancement stream is done with the NOTIFY message in the case of an implementation using the H248 protocol.

In this example, it is considered that the mobile access network does not have the necessary resources, in terms of bandwidth in particular, required to support the transmission of an enhancement stream as a supplement to the basic stream. Nevertheless, the invention is not limited to this example. It is very possible to envisage in the short term a mobile access network capable of carrying one or more enhancement streams. In this case, the second phase of the method according to the invention is implemented in a manner analogous to the sequencing described in FIG. 4.

At this juncture, the user terminal 10 therefore receives the basic stream only by way of the first access network 31. Let us now consider that the user changes his mind and decides to return home to view the audiovisual content under better conditions until the end of the session. As mentioned previously, the method according to the invention implements a step of saving the context related to a session in an access network. In this particular case, the save context is implemented during the sequence 4.k for the content enrichment phase. This step consists in saving, at the gateway controller 52 level, the context parameters related to the enrichment of the data stream transmitted for the audiovisual session considered.

Thus, when the user terminal approaches a radio access point of the second access network, the instigating of the save context avoids the need to trigger steps 4.a, 4.b, 4.c, 4.d, 4.e, 4.f and so makes it possible to begin the sequencing of the enrichment from step 4.g.

The underlying assumption which is made is that the conditions regarding the availability of the network resources remain valid since the mobility of the network from fixed to mobile and then fixed is instantaneous.

For the practical implementation of this save mechanism, it is possible to consider the implementation of a timer configurable by the operator. During the mobility of the user from the fixed network to the mobile network, this timer is triggered and if the user then effects a reverse mobility (from the mobile network to this same fixed network) before this timer expires, then this context is taken into account. In the case where this timer expires, the sequencing of the enrichment is carried out in a complete manner (that is to say with reactivation of steps 4.a, 4.b, 4.c, 4.d, 4.e, 4.f) since the availability of the resources is no longer ensured.

The invention claimed is:

1. A method of switching over an audiovisual session in a telecommunications network comprising at least one first access network and one second access network, an audiovisual session being in progress, during which at least one user terminal attached to said first access network and able to attach itself to said second access network receives from a contents server at least one data stream constituent of an audiovisual content by way of a data stream gateway comprising a first interface to said first access network and a second output interface to said second access network, wherein said audiovisual content is encoded in the form of a plurality of scaled data streams comprising a basic stream and at least one enhancement stream, said method, when said terminal has attached itself to said second access network, comprising the steps:

receiving a request for session switchover to the second access network, said switchover request having been emitted following a change of a state of attachment of said terminal to said second network;

ordering switchover of said audiovisual session at said data stream gateway from the first output interface to the second output interface;

recovering information related to a context of said audiovisual session switched over to the second interface;

ordering evaluation at a contents profile server of an adaptation of the audiovisual content quality, that can be supported by said second interface, of the audiovisual content transmitted for said audiovisual session as a function of said recovered information related to the context of said audiovisual session switched over to the second interface;

receiving from said contents profile server a response comprising characteristics of an adaptation of the audiovisual content quality that can be supported by said second interface, said response of said contents profile server indicating a number of enhancement streams to be activated;

saving context information relating to connections established between said user terminal and said data stream gateway in respect of said audiovisual session for a predetermined duration; and requesting to the contents server an update of said data stream emitted during said audiovisual session on the basis of the received characteristics of an adaptation of the audiovisual content quality that can be supported by said second interface, so as to ensure said evaluated adaptation of quality.

2. The method of switching over an audiovisual session according to claim 1, further comprising, prior to the step of ordering switchover, the following steps:

sending said user terminal a command to establish connection to said second interface, said command comprising information required for said connection;

sending the data stream gateway a notification of sending of command for connection to the terminal, comprising information relating to said session and to said terminal.

3. The method of switching over an audiovisual session according to claim 1, further comprising, following the step of ordering switchover and prior to the step of requesting updating of said data stream, a step of receiving a notification on the part of said gateway indicating that the switchover of said data stream has been performed.

4. The method of switching over an audiovisual session according to claim 1, wherein said recovered context information comprises at least one information item from among the following information:
- an information item relating to a profile of said user;
- an information item relating to resources of a second access link situated between said second interface and the user terminal when the latter is attached to the second access network;
- an information item relating to capabilities of said user terminal; and
- an information item relating to characteristics of encoding of the audiovisual content by the contents server.

5. The method of switching over an audiovisual session according to claim 1, said method further comprising the following steps:
- ordering emission of said at least enhancement stream to the contents server;
- receiving a notification by the gateway confirming the receipt of said at least one enhancement stream on its input interface;
- sending the user terminal a command for additional connection to said second interface of said gateway intended to carry said enhancement stream, said command comprising information relating to said additional connection;
- sending the gateway a notification indicating that said at least one enhancement stream received is intended for said additional connection; and
- receiving a confirmation of enabling of the additional connection for the transmission of said at least one enhancement stream.

6. The method of switching over an audiovisual session according to claim 1, wherein, when an additional connection has been established with the first interface of said gateway so as to transmit an enhancement stream, said method further comprises, following the step of receiving a request for switching over to said second access network by said user terminal, a step of disconnecting said additional connection.

7. An audiovisual data stream gateway controller in a telecommunications network comprising a first access network, a second access network and a data stream gateway comprising an input interface able to receive data streams and a first and a second output interface able to transmit said streams respectively to the first and the second access network, an audiovisual session being in progress during which a user terminal attached to said first access network and able to attach itself to said second access network receives from a contents server at least one data stream constituent of an audiovisual content by way of said first interface, wherein said audiovisual content is encoded in the form of a plurality of scaled data streams comprising a basic stream and at least one enhancement stream, said controller configured for:
- receiving a request for switchover of said audiovisual session to the second access network, emitted following a change of a state of attachment of said user terminal to said first and second access networks;
- sending said gateway a command for switchover of said audiovisual session from said first interface to said second interface;
- recovering information related to a context of said audiovisual session switched over to the second interface;
- ordering evaluation at a contents profile server of an adaptation of the audiovisual content quality of said audiovisual session that can be supported by said second interface as a function of said recovered information related to the context of said audiovisual session switched over to the second interface;
- receiving from said contents profile server a response comprising characteristics of an adaptation of the audiovisual content quality that can be supported by said second interface, said response of said contents profile server indicating a number of enhancement streams to be activated;
- saving context information relating to connections established between said user terminal and said data stream gateway in respect of said audiovisual session for a predetermined duration; and
- requesting to the contents server an update of said at least one data stream emitted during the audiovisual session on the basis of the received characteristics of an adaptation of the audiovisual content quality that can be supported by said second interface making it possible to ensure said supported adaptation of quality.

8. A data stream gateway in a telecommunications network comprising at least one first access network, and one second access network, and a gateway controller, said gateway comprising an input interface able to receive at least one data stream emitted by a contents server and first and second output interfaces able to transmit said at least one data stream received respectively to said first and second access network, an audiovisual session being in progress during which at least one user terminal attached to said first access network and able to attach itself to said second access network receives at least one data stream constituent of an encoded audiovisual content by way of said first output interface, wherein said audiovisual content is encoded in the form of a plurality of scaled data streams comprising a basic stream and at least one enhancement stream, said gateway configured for:
- receiving a command for switchover of said audiovisual session from the first to the second interface, emitted following a change of a state of attachment of said user terminal to said first and second access networks;
- switching over the audiovisual content from the first interface to the second interface when transmission is in progress;
- receiving a notification of adaptation of quality of said audiovisual session by said contents server; and
- updating said second output interface which are able to implement said adaptation of quality;

said gateway controller configured for:
- ordering evaluation at a contents profile server of an adaptation of the audiovisual content quality, that can be supported by said second interface, of the audiovisual content transmitted for said audiovisual session as a function of said recovered information related to the context of said audiovisual session switched over to the second interface;
- receiving from said contents profile server a response comprising characteristics of an adaptation of the audiovisual content quality that can be supported by said second interface, said response of said contents profile server indicating a number of enhancement streams to be activated;
- saving context information relating to connections established between said user terminal and said data stream gateway in respect of said audiovisual session for a predetermined duration; and
- requesting to the contents server an update of said data stream emitted during said audiovisual session on the basis of the received characteristics of an adaptation of the audiovisual content quality that can be supported by said second interface, so as to ensure said evaluated adaptation of quality.

9. The gateway for audiovisual streams according to claim 8, said gateway configured for receiving a notification of sending of command for connection to said second interface to the terminal by said controller, wherein it is able to switch over the audiovisual content from the first interface to the second interface after receiving said notification, and wherein it is able to implement sending a confirmation of switchover to said controller, once said connection has been established with the terminal.

10. The gateway according to claim 8, wherein the audiovisual content being encoded in the form of a plurality of scaled data streams, comprising at least one basic data stream and at least one enhancement stream, said notification of updating indicates a number of enhancement data streams whose transmission must be activated, in that said updating the second interface comprises establishing at least one additional connection with said user terminal so as to carry said at least one enhancement stream and in that said gateway is configured for sending a confirmation of updating of said session to said controller, once said at least one additional connection has been established.

11. The gateway according to claim 8, wherein the gateway is disposed with the first interface connected to a first input gateway to the first access network and the second interface connected to a second input gateway to the second access network.

12. A user terminal in a telecommunications network comprising a first and a second access network, a gateway controller, and a data stream gateway comprising an input interface able to receive data streams and a first and a second output interface able to transmit said streams respectively to the first and the second access network, an audiovisual session being in progress, during which said terminal, attached to said first access network and able to attach itself to the second access network, receives at least one data stream constituent of an audiovisual content by way of a first connection to said first output interface, said terminal able to implement, when it has attached itself to said second access network, wherein said audiovisual content is encoded in the form of a plurality of scaled data streams comprising a basic stream and at least one enhancement stream, the user terminal configured for:
receiving a command for establishing a second connection to said second interface, intended to allow switchover of said at least one data stream from the first to the second interface, said command comprising information required for said connection;
establishing said second connection to the second interface with the aid of said information;
receiving instructions relating to an adaptation of the quality of the audiovisual session in progress on the second interface; and
adapting the quality of the audiovisual session in progress;
said gateway controller configured for:
ordering evaluation at a contents profile server of an adaptation of the audiovisual content quality, that can be supported by said second interface, of the audiovisual content transmitted for said audiovisual session as a function of said recovered information related to the context of said audiovisual session switched over to the second interface;
receiving from said contents profile server a response comprising characteristics of an adaptation of the audiovisual content quality that can be supported by said second interface, said response of said contents profile server indicating a number of enhancement streams to be activated;
saving context information relating to connections established between said user terminal and said data stream gateway in respect of said audiovisual session for a predetermined duration; and
requesting to a contents server an update of said data stream emitted during said audiovisual session on the basis of the received characteristics of an adaptation of the audiovisual content quality that can be supported by said second interface, so as to ensure said evaluated adaptation of quality.

13. The user terminal according to claim 12, wherein, the audiovisual content being encoded in the form of a plurality of scaled data streams, comprising at least one basic stream and one enhancement stream, and said instructions relating to an adaptation of the quality of the audiovisual session in progress comprising at least one command for additional connection to said second interface of said gateway, said at least one additional connection for transmission of at least one enhancement stream, said step of adapting the quality of the audiovisual session being able to trigger said step of establishing said additional connection to said second interface of said gateway.

14. A telecommunications network comprising at least one first access network, one second access network, a data stream gateway comprising an input interface able to receive data streams and a first and a second output interface able to transmit the streams received respectively to the first and the second access networks and a gateway controller able to control said gateway, an audiovisual session being in progress, during which a terminal, attached to said first access network and able to attach itself to the second access network, wherein said audiovisual content is encoded in the form of a plurality of scaled data streams comprising a basic stream and at least one enhancement stream, receives at least one data stream constituent of an audiovisual content by way of a first connection to said first output interface of said gateway, wherein said gateway controller is configured for:
receiving a request for switchover of said audiovisual session to the second access network, emitted following a change of a state of attachment of said user terminal to said first and second access networks;
sending said gateway a command for switchover of said audiovisual session from said first interface to said second interface;
recovering information related to a context of said audiovisual session switched over to the second interface;
ordering evaluation by a contents profile server of an adaptation of the audiovisual content quality of said audiovisual session that can be supported by said second interface as a function of said recovered information related to the context of said audiovisual session switched over to the second interface;
receiving from said contents profile server a response comprising characteristics of an adaptation of the audiovisual content quality that can be supported by said second interface, said response of said contents profile server indicating a number of enhancement streams to be activated;
saving context information relating to connections established between said user terminal and said data stream gateway in respect of said audiovisual session for a predetermined duration; and
requesting to a contents server an update of the audiovisual session on the basis of the received characteristics of an adaptation of the audiovisual content quality that can be supported by said second interface making it possible to ensure said supported adaptation of quality.

15. A contents profile server in a telecommunications network comprising at least one first access network, one second access network, a data stream gateway comprising a first and a second output interface able to pass data streams respectively to the first and second access networks and a gateway controller able to control said gateway, an audiovisual session being in progress during which at least one user terminal attached to said first access network and able to attach itself to the second access network receives from a contents server at least one data stream constituent of an encoded audiovisual content by way of said first output interface, wherein said audiovisual content is encoded in the form of a plurality of scaled data streams comprising a basic stream and at least one enhancement stream, wherein said gateway controller is configured for:
- receiving a request for session switchover to the second access network, said switchover request having been emitted following a change of a state of attachment of said terminal to said second network;
- sending said gateway a command for switchover of said audiovisual session from said first interface to said second interface;
- recovering information related to a context of said audiovisual session switched over to the second interface;
- ordering evaluation by the contents profile server of an adaptation of the audiovisual content quality of said audiovisual session that can be supported by said second interface as a function of said recovered information related to the context of said audiovisual session switched over to the second interface;
- receiving from said contents profile server a response comprising characteristics of an adaptation of the audiovisual content quality that can be supported by said second interface, said response of said contents profile server indicating a number of enhancement streams to be activated;
- saving context information relating to connections established between said user terminal and said data stream gateway in respect of said audiovisual session for a predetermined duration; and
- requesting to the contents server an update, of the audiovisual session on the basis of the received characteristics of an adaptation of the audiovisual content quality that can be supported by said second interface making it possible to ensure said supported adaptation of quality, said contents profile server configured for evaluating an adaptation of quality, that can be supported by said audiovisual session, of the audiovisual content transmitted as a function of said information recovered in response to said evaluation command and sending a response to said controller.

16. A mobility server in a telecommunications network, comprising at least one first access network, one second access network, a data stream gateway comprising a first and a second output interface able to pass data streams respectively to the first and second access networks and a gateway controller able to control said gateway, an audiovisual session being in progress during which at least one user terminal attached to said first access network and able to attach itself to said second access network receives from a contents server at least one data stream constituent of an encoded audiovisual content by way of said first output interface, wherein said audiovisual content is encoded in the form of a plurality of scaled data streams comprising a basic stream and at least one enhancement stream, said mobility server configured for:
- receiving a notification of change of a state of attachment of said user terminal to said first and second access networks, said notification comprising at least one location of said user terminal and an identification of the audiovisual session;
- analyzing said notification of change, for determining whether the audiovisual session in progress must be switched over from the first access network to the second access network;
- identifying said gateway controller in charge of controlling said session on the basis of the location information;
- sending a request for session switchover from the first access network to the second access network to said gateway controller;

said gateway controller configured for:
- ordering evaluation at a contents profile server of an adaptation of the audiovisual content quality, that can be supported by said second interface, of the audiovisual content transmitted for said audiovisual session as a function of said recovered information related to the context of said audiovisual session switched over to the second interface;
- receiving from said contents profile server a response comprising characteristics of an adaptation of the audiovisual content quality that can be supported by said second interface, said response of said contents profile server indicating a number of enhancement streams to be activated;
- saving context information relating to connections established between said user terminal and said data stream gateway in respect of said audiovisual session for a predetermined duration; and
- requesting to a contents server an update of said data stream emitted during said audiovisual session on the basis of the received characteristics of an adaptation of the audiovisual content quality that can be supported by said second interface, so as to ensure said evaluated adaptation of quality.

17. A non-transitory computer program product downloadable from a communication network readable by computer and executable by a microprocessor, said computer program product comprising program code instructions for the execution of the method according to claim 1.

* * * * *